US012380363B2

(12) United States Patent
Ishii et al.

(10) Patent No.: US 12,380,363 B2
(45) Date of Patent: Aug. 5, 2025

(54) DATA CONVERSION LEARNING APPARATUS, PATTERN RECOGNITION DEVICE, DATA CONVERSION LEARNING METHOD, AND RECORDING MEDIUM

(71) Applicant: NEC Corporation, Tokyo (JP)

(72) Inventors: Masato Ishii, Tokyo (JP); Takashi Takenouchi, Saitama (JP); Masashi Sugiyama, Saitama (JP)

(73) Assignee: NEC CORPORATION, Tokyo (JP)

( * ) Notice: Subject to any disclaimer, the term of this patent is extended or adjusted under 35 U.S.C. 154(b) by 1058 days.

(21) Appl. No.: 17/422,678

(22) PCT Filed: Jan. 22, 2019

(86) PCT No.: PCT/JP2019/001842
§ 371 (c)(1),
(2) Date: Jul. 13, 2021

(87) PCT Pub. No.: WO2020/152774
PCT Pub. Date: Jul. 30, 2020

(65) Prior Publication Data
US 2022/0121990 A1    Apr. 21, 2022

(51) Int. Cl.
*G06N 20/00*    (2019.01)
*G06F 18/21*    (2023.01)
(Continued)

(52) U.S. Cl.
CPC ........... *G06N 20/00* (2019.01); *G06F 18/217* (2023.01); *G06F 18/2321* (2023.01); *G06N 3/02* (2013.01)

(58) Field of Classification Search
None
See application file for complete search history.

(56) References Cited

U.S. PATENT DOCUMENTS

| 2018/0253628 | A1 | 9/2018 | Wang et al. |
| 2020/0134442 | A1* | 4/2020 | Sim .......................... G06N 3/08 |
| 2020/0342643 | A1* | 10/2020 | Gouws .................... G06T 11/60 |

FOREIGN PATENT DOCUMENTS

| CN | 104102917 B | * | 5/2017 | |
| CN | 108629314 A | * | 10/2018 | ......... G06K 9/00268 |

(Continued)

OTHER PUBLICATIONS

International Search Report for PCT Application No. PCT/JP2019/001842, mailed on Apr. 23, 2019.
(Continued)

*Primary Examiner* — Xuyang Xia

(57) ABSTRACT

A data conversion learning apparatus includes a data conversion unit that performs data conversion of source data and target data, a first deduction unit that deduces data of a non-appearing class on the basis of a domain certainty factor acquired by a domain identification using converted data, a second deduction unit that deduces data of a non-appearing class on the basis of a class certainty factor acquired by a class identification using converted data, a class identification learning unit that performs machine learning for class identification using the data of the non-appearing class deduced by the first deduction unit and the source data and the target data which are inputs, and a domain identification learning unit that performs machine learning for domain identification using the data of the non-appearing class deduced by the second deduction unit and the source data and the target data which are inputs.

7 Claims, 7 Drawing Sheets

(51) Int. Cl.
*G06F 18/2321* (2023.01)
*G06N 3/02* (2006.01)

(56) References Cited

FOREIGN PATENT DOCUMENTS

JP       2018-529157 A     10/2018
WO    WO-2017046828 A1 *  3/2017   ............. G06K 9/622

OTHER PUBLICATIONS

Ganin et al., "Domain-Adversarial Training of Neural Networks", Journal of Machine Learning Research, vol. 17, 2016, pp. 1-35.
Sugiyama et al., "Learning under Non-Stationarity: Covariate Shift Adaptation, Class-Balance Change Adaptation, and Change Detection", Journal of the Japan Statistical society, Japanese Issue, vol. 44, No. 1, 2014, pp. 113-136.
Sugiyama, "Big Data Analysis by Density Ratio Estimation", Journal of the Institute of Electronics, Information and Communication Engineers, vol. 97, No. 5, 2014, pp. 353-358.

* cited by examiner

DATA CONVERSION LEARNING APPARATUS, PATTERN RECOGNITION DEVICE, DATA CONVERSION LEARNING METHOD, AND RECORDING MEDIUM

This application is a National Stage Entry of PCT/JP2019/001842 filed on Jan. 22, 2019, the contents of all of which are incorporated herein by reference, in their entirety.

TECHNICAL FIELD

The present invention relates to a data conversion learning apparatus, a pattern recognition device, a data conversion learning method, and a recording medium.

BACKGROUND ART

Deducing which class an input pattern belongs to is referred to as pattern recognition. Examples of pattern recognition include object recognition for deducing a photographed object using an image as an input and voice recognition for deducing utterance content using a voice as an input.

Machine learning can be used to realize pattern recognition. For example, in supervised learning, a pattern with a label indicating a recognition result is used as learning data to perform machine learning so that a relationship between the pattern and the label is reflected in a model. The result of pattern recognition can be obtained by applying a model obtained from machine learning to an unlabeled pattern to be recognized. The unlabeled pattern to be recognized is referred to as test data.

In many machine learning methods, it is supposed that the distribution of learning data and the distribution of test data match each other. A difference between the distributions of the learning data and the test data leads to a decrease in the performance of pattern recognition depending on the degree of difference. For example, in object recognition using an image, the performance of the object recognition deteriorates significantly in a case where machine learning is performed on a model using learning data composed of a photographed image and the model is evaluated using test data composed of an illustration image. This is because the appearance of an object in an image differs greatly between the photographed image and the illustration image, and therefore the distribution of the learning data and the distribution of the test data differ greatly from each other.

Domain adaptation is a method for matching two or more data distributions (see, for example, Patent Document 1). A domain is the affiliation of data generated from a certain probability distribution. A domain of an adaptation source is referred to as a source domain, and a domain of an adaptation destination is referred to as a target domain. In addition, data of a source domain is referred to as source data, and data of a target domain is referred to as target data.

In a case where domain adaptation is executed as preprocessing of machine learning, for example, domain adaptation is executed using learning data as source data and test data as target data. By executing such domain adaptation, the learning data is converted from the data of a source domain to the data of a target domain. This makes it possible to match the distribution of the learning data and the distribution of the test data or to perform data conversion so as to reduce a difference therebetween. By performing machine learning and evaluation on a model using converted data, it is possible to avoid or reduce the above-described decrease in the performance of pattern recognition due to the difference between the distributions of the learning data and the test data.

One approach used in domain adaptation is an approach based on adversarial learning. In such an approach, when machine learning is performed on data conversion, a class identifier that identifies a class using data that has undergone data conversion as an input and a domain identifier that identifies a domain using data that has undergone data conversion as an input perform machine learning using the same learning data. In such an approach, machine learning is performed on data conversion so as to make it difficult for the domain identifier to identify a pattern while the class identifier recognizes the pattern. The difficulty of the domain identifier in performing identification means that the distributions of data are similar to each other between domains. Therefore, domain adaptation can be realized by performing machine learning on data conversion adversarially to the domain identifier.

PRIOR ART DOCUMENTS

Patent Literature

[Patent Document 1] PCT Japanese Translation Patent Publication No. 2018-529157

SUMMARY OF THE INVENTION

Problem to be Solved by the Invention

A general approach to domain adaptation based on adversarial learning requires that all classes appearing in source data appear in target data. In contrast, it may be difficult to collect target data covering data of all classes, such as in a case where the cost of collecting the target data is high.

It is assumed that there is a class C that appears in the source data but does not appear in the target data. In this case, insofar as, when data of the class C is input, the domain identifier can recognize that the input data belongs to the class C, it is possible to correctly identify a domain if the domain of this data is a source domain.

In contrast, in a general approach to domain adaptation based on adversarial learning, machine learning is performed on data conversion so as to make it difficult for the domain identifier to perform identification as described above. In order to make it difficult for the domain identifier to perform identification, it is necessary to make it impossible to recognize that the data belongs to the class C. When machine learning is performed on data conversion so that identification performed by the domain identifier becomes difficult, it becomes difficult to perform class identification on the data of the class C, which leads to a decrease in the accuracy of identification. An approach of performing machine learning on data conversion so that identification performed by the domain identifier becomes difficult leads to a decrease in the accuracy of domain adaptation in this regard. That is, the degree of similarity between the probability distribution of the source data and the probability distribution of the target data due to domain adaptation decreases.

On the other hand, a case where domain adaptation is performed using only data of a class that appears in both the source domain and the target domain without using data of a class that does not appear in the target domain like the above data of the class C can be considered. In this case, the data distributions of unused classes cannot be matched between domains, which also leads to a decrease in the accuracy of domain adaptation.

An example object of the present invention is to provide a data conversion learning apparatus, a pattern recognition device, a data conversion learning method, and a recording medium capable of solving the problems mentioned above.

Means for Solving the Problem

According to a first example aspect of the present invention, a data conversion learning apparatus includes: a data conversion unit that performs data conversion for bringing a probability distribution of data of a source domain and a probability distribution of data of a target domain close to each other; an identification unit that calculates at least any one of a domain certainty factor indicating certainty that data that has undergone the data conversion belongs to the domain for each of the source domain and the target domain, and a class certainty factor indicating certainty that the data that has undergone the data conversion belongs to the class for each class into which the data of the source domain is classified; and a learning unit that calculates a loss related to a non-appearing class which is a class that does not appear in the target domain among the classes and the target domain using at least any one of the domain certainty factor and the class certainty factor and performs machine learning on the data conversion using the calculated loss.

According to a second example aspect of the present invention, a data conversion learning method includes: a step of performing data conversion for bringing a probability distribution of data of a source domain and a probability distribution of data of a target domain close to each other; a step of calculating at least any one of a domain certainty factor indicating certainty that data that has undergone the data conversion belongs to the domain for each of the source domain and the target domain, and a class certainty factor indicating certainty that the data that has undergone the data conversion is classified into the class for each class into which the data of the source domain is classified; a step of calculating a loss related to a non-appearing class which is a class that does not appear in the target domain among the classes and the target domain using at least any one of the domain certainty factor and the class certainty factor; and a step of performing machine learning on the data conversion using the calculated loss.

According to a third example aspect of the present invention, a recording medium records a program for causing a computer to execute: a step of performing data conversion for bringing a probability distribution of data of a source domain and a probability distribution of data of a target domain close to each other; a step of calculating at least any one of a domain certainty factor indicating certainty that data that has undergone the data conversion belongs to the domain for each of the source domain and the target domain, and a class certainty factor indicating certainty that the data that has undergone the data conversion is classified into the class for each class into which the data of the source domain is classified; a step of calculating a loss related to a non-appearing class which is a class that does not appear in the target domain among the classes and the target domain using at least any one of the domain certainty factor and the class certainty factor; and a step of performing machine learning on the data conversion using the calculated loss.

Effect of the Invention

According to the data conversion learning apparatus, the pattern recognition device, the data conversion learning method, and the recording medium which are described above, in a case where there is a non-appearing class which is a class that does not appear in the target domain among classes appearing in the source domain, it is possible to avoid or reduce a decrease in the accuracy of domain adaptation.

EXAMPLE EMBODIMENT

Hereinafter, example embodiments of the present invention will be described, but the following example embodiments do not limit the invention relating to the scope of claims. In addition, all combinations of features described in the example embodiments are not necessarily essential for the solution to problems.

Hereinafter, it is supposed that information on which classes do not appear in a target domain is obtained. A class that does not appear in a target domain is referred to as a non-appearing class.

A class appearing in a domain as used herein involves data of the class and the domain being present. A class not appearing in a domain involves data of the class and the domain not being present.

The non-appearing class is a class in which there is no target data to be classified among the classes into which source data is classified. Just as there is data classified into a non-appearing class in a source domain, data classified into a non-appearing class is also expected to appear in the data distribution of a target domain when the number of samples (the number of data) increases. On the other hand, in the range of data given to a data conversion learning apparatus 100, data classified as unclassified data is not included in data of a target domain.

Figure 1:
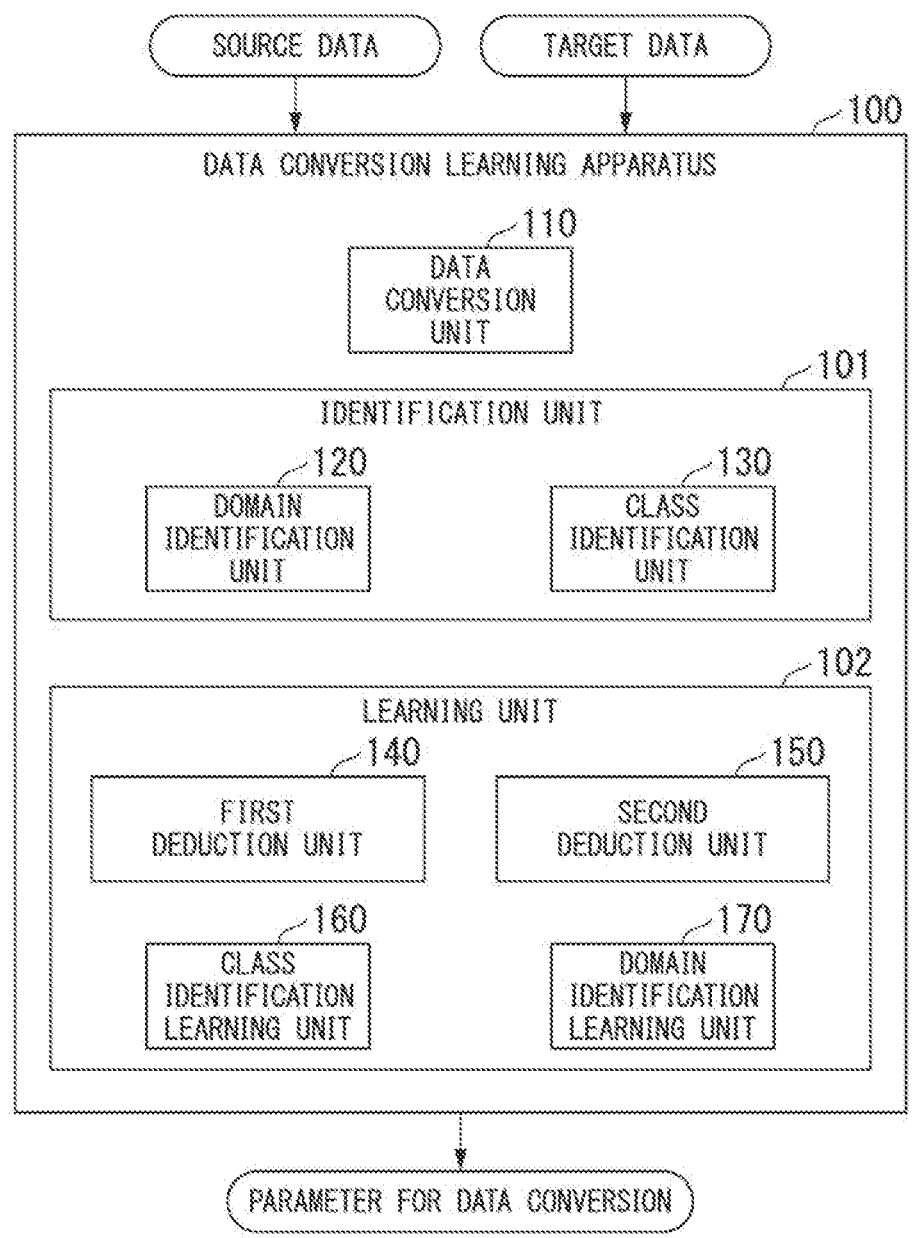
FIG. 1 is a schematic block diagram illustrating an example of a functional configuration of a data conversion learning apparatus according to an example embodiment.

FIG. 1 is a schematic block diagram illustrating an example of a functional configuration of a data conversion learning apparatus according to an example embodiment.

In the configuration shown in FIG. 1, the data conversion learning apparatus 100 includes a data conversion unit 110, a domain identification unit 120, a class identification unit 130, a first deduction unit 140, a second deduction unit 150, a class identification learning unit 160, and a domain identification learning unit 170.

A combination of the domain identification unit 120 and the class identification unit 130 is referred to as an identification unit 101. A combination of the first deduction unit 140, the second deduction unit 150, the class identification learning unit 160, and the domain identification learning unit 170 is referred to as a learning unit 102.

The data conversion learning apparatus 100 calculates a loss related to a non-appearing class and a target domain, and performs machine learning on parameter values of a function of domain adaptation using losses related to all classes and all domains including the calculated loss. The loss referred to here is an empirical loss used for machine learning of a neural network or the like. The sum of losses for all data is used as an objective variable in machine learning, and the data conversion learning apparatus 100 performs machine learning so as to minimize the sum of losses. For example, the data conversion learning apparatus 100 may execute steps in each step in machine learning so that the sum of losses is equal to or less than a value before the step is executed.

Hereinafter, the machine learning is also simply referred to as learning.

The data conversion learning apparatus 100 calculates losses for all classes and all domains including a non-appearing class and a target domain in which there is no data given to the data conversion learning apparatus 100, and performs machine learning so as to minimize the sum of losses. Through such machine learning, the data conversion learning apparatus 100 also uses not only data of a class that appears in both the source domain and the target domain before the execution of domain adaptation but also data of a non-appearing class to match data distributions or reduce a difference between the data distributions. Thereby, it is possible to avoid or reduce a decrease in the accuracy of identification of the non-appearing class as described above.

Here, domain adaptation will be described with reference to FIGS. 2 and 3.

Figure 2:
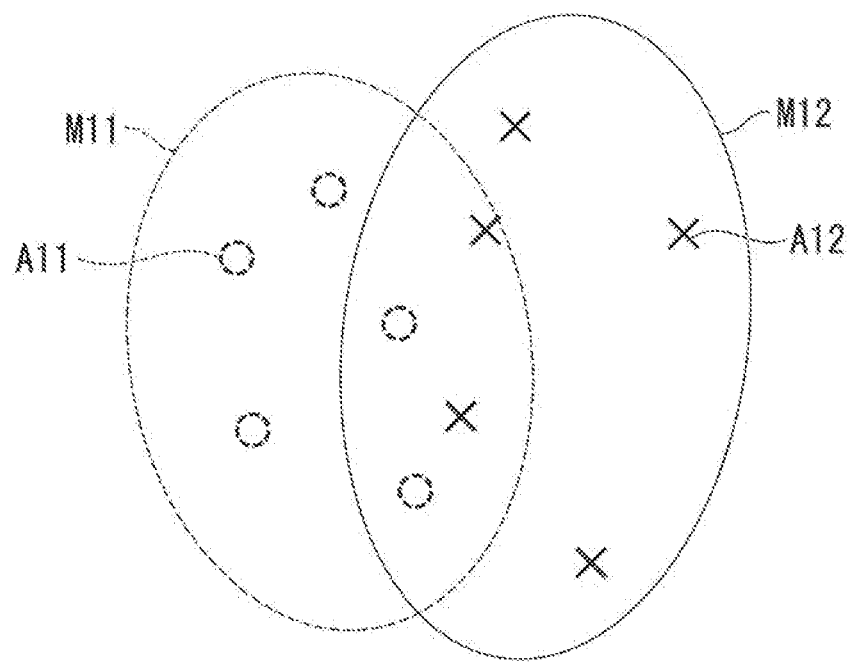
FIG. 2 is a diagram schematically illustrating an example of a domain before domain adaptation.

FIG. 2 is a diagram schematically illustrating an example of a domain before domain adaptation.

FIG. 2 shows a first domain M11 including first data A11 and a second domain M12 including second data A12.

A portion in which the first domain M11 and the second domain M12 overlap each other schematically represents a portion in which the first domain M11 and the second domain M12 match each other. A portion of the first domain M11 that does not overlap the second domain M12 schematically represents a portion of the first domain M11 that differs from the second domain M12. A portion of the second domain M12 that does not overlap the first domain M11 schematically represents a portion of the second domain M12 that differs from the first domain M11.

Figure 3:
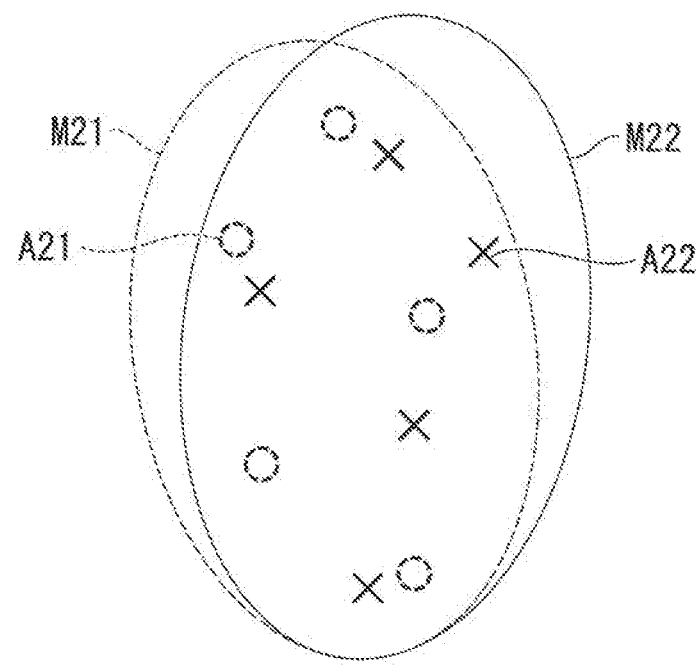
FIG. 3 is a diagram schematically illustrating an example of a domain after domain adaptation.

FIG. 3 is a diagram schematically illustrating an example of a domain after domain adaptation.

FIG. 3 shows a third domain M21 including third data A21 and a fourth domain M22 including fourth data A22. The third data A21, the third domain M21, the fourth data A22, and the fourth domain M22 are obtained by performing conversion based on data adaptation on the first data A11, the first domain M11, the second data A12, and the second domain M12, respectively.

Any one or more of the first data A11, the first domain M11, the second data A12, and the second domain M12 may be the same before and after domain adaptation. For example, the first domain M11 may be a source domain, and the second domain M12 may be a target domain. In this case, the first domain M11 changes depending on domain adaptation. On the other hand, the second domain M12 is the same before and after domain adaptation.

A portion in which the third domain M21 and the fourth domain M22 overlap each other schematically represents a portion in which the third domain M21 and the fourth domain M22 match each other. A portion of the third domain M21 that does not overlap the fourth domain M22 schematically represents a portion of the third domain M21 that differs from the fourth domain M22. A portion of the fourth domain M22 that does not overlap the third domain M21 schematically represents a portion of the fourth domain M22 that differs from the third domain M21.

In FIGS. 2 and 3, the ratio of the area of a portion in which the two domains do not overlap each other to the total area of the two domains schematically represents the magnitude of a difference between the two domains. In FIG. 2, the two domains are the first domain M11 and the second domain M12. In FIG. 3, the two domains are the third domain M21 and the fourth domain M22.

Comparing FIG. 2 and FIG. 3, the ratio of the area of a portion in which the two domains do not overlap each other to the total area of the two domains in FIG. 3 is smaller than the ratio of the area of a portion in which the two domains do not overlap each other to the total area of the two domains in FIG. 2. This schematically represents that the difference between the third domain M21 and the fourth domain M22 is smaller than the difference between the first domain M11 and the second domain M12. Therefore, in the examples of FIGS. 2 and 3, the difference between the two domains is reduced by domain adaptation.

If the data conversion learning apparatus 100 calculates a loss for each data and calculates the sum of losses for all data, there is no data given to the data conversion learning apparatus 100 in the non-appearing class and the target domain. That is, target data of the non-appearing class is not included in the data given to the data conversion learning apparatus 100. For this reason, the data conversion learning apparatus 100 cannot directly calculate the loss related to the non-appearing class and the target domain on the basis of the data.

Consequently, the data conversion learning apparatus 100 uses two methods for deducing the loss related to the non-appearing class and the target domain. The first of the two methods is to apply a weight calculated on the basis of a domain certainty factor to a loss calculated for data of the non-appearing class in the source data and calculate the loss related to the non-appearing class and the target domain.

The domain certainty factor of a certain domain is a degree to which a domain of data is likely to be the domain. For example, the domain certainty factor of a source domain is a degree to which a domain of data is likely to be the source domain. The domain certainty factor of a target domain is a degree to which a domain of data is likely to be the target domain.

The second of the two methods is to apply a weight calculated on the basis of a class certainty factor to a loss calculated for data of a class other than the non-appearing class in the target data and calculate the loss related to the non-appearing class and the target domain. The class certainty factor of a certain class is a degree to which a class of data is likely to be the class. For example, the class certainty factor of a non-appearing class is a degree to which a class of data is likely to be the non-appearing class.

The domain certainty factor and the class certainty factor are calculated using a domain identifier and a class identifier, respectively. In the data conversion learning apparatus 100, the domain identification unit 120 functions as the domain identifier, and the class identification unit 130 functions as the class identifier.

The data conversion learning apparatus 100 applies the obtained loss to learning of the deduction of the domain certainty factor performed by the domain identification unit 120, and deduction of the calculation of the class certainty factor performed by the class identification unit 130. In a case where the loss obtained using the domain certainty factor is applied to the learning of the deduction of the domain certainty factor in the domain identification unit 120, the learning efficiency is very poor. In addition, in a case where the loss obtained using the class certainty factor is applied to the learning of the deduction of the class certainty factor in the class identification unit 130, the learning efficiency is very poor.

Consequently, the data conversion learning apparatus 100 uses the loss obtained using the domain certainty factor for learning the deduction of the class certainty factor in the class identification unit 130, and uses the loss obtained using the class certainty factor for learning the deduction of the domain certainty factor in the domain identification unit 120. Thereby, the data conversion learning apparatus 100 avoids the decrease in the learning efficiency described above.

The data conversion unit 110 performs data conversion using the source data and the target data as inputs. Specifically, the data conversion unit 110 performs domain adaptation. However, the data conversion unit 110 acquires parameter values for domain adaptation through machine learning. At the stage where machine learning is not progressing, the accuracy of domain adaptation is not high. The accuracy of domain adaptation is the accuracy of bringing the probability distribution of the source data and the probability distribution of the target data close to each other through domain adaptation.

The domain identification unit 120 functions as the domain identifier as described above, and identifies a domain from the data converted by the data conversion unit 110. The domain identification unit 120 outputs a domain certainty factor as a domain identification result.

The class identification unit 130 functions as the class identifier as described above, and identifies a class from the data converted by the data conversion unit 110. The class identification unit 130 outputs a class certainty factor as a class identification result.

The first deduction unit 140 deduces a weight for obtaining the loss related to the non-appearing class and the target domain on the basis of the domain certainty factor acquired from the domain identification unit 120.

The second deduction unit 150 deduces a weight for obtaining the loss related to the non-appearing class and the target domain on the basis of the class certainty factor acquired from the class identification unit 130.

The class identification learning unit 160 uses data of the non-appearing class deduced by the first deduction unit 140 and the source data and the target data of inputs to perform machine learning for domain adaptation performed by the data conversion unit 110 and machine learning for class identification performed by the class identification unit 130.

The domain identification learning unit 170 uses data of the non-appearing class deduced by the second deduction unit 150 and the source data and the target data of inputs to perform machine learning for domain adaptation performed by the data conversion unit 110 and machine learning for domain identification performed by the domain identification unit 120.

An example of processing performed by the data conversion learning apparatus 100 will be described.

Figure 4:
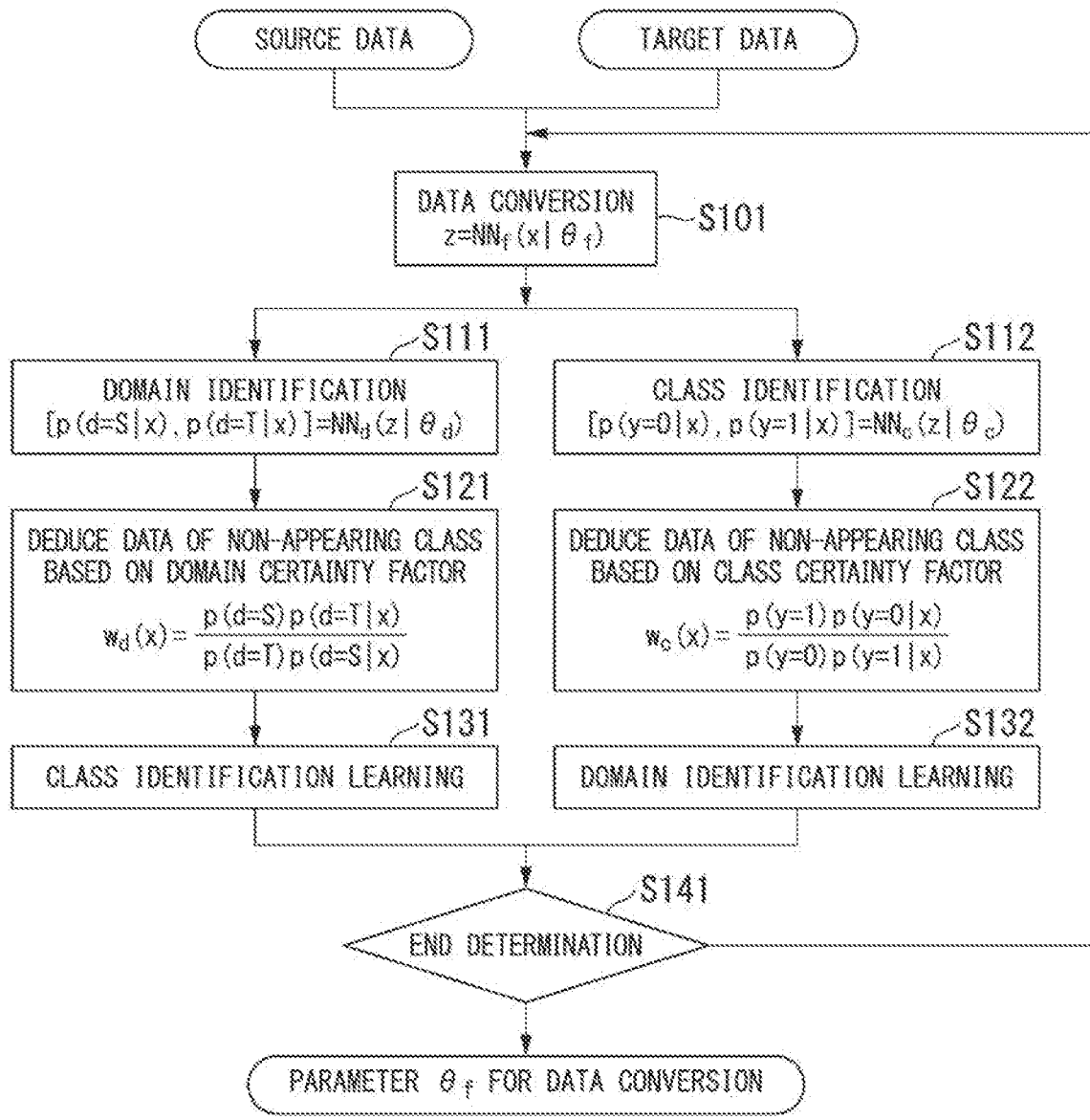
FIG. 4 is a diagram illustrating an example of a procedure of processing performed by the data conversion learning apparatus according to the example embodiment.

FIG. 4 is a diagram illustrating an example of a procedure of processing performed by the data conversion learning apparatus 100.

Hereinafter, data is denoted as x, a class is denoted as y, and domain information is denoted as d. In addition, it is assumed that there are two domains, that is, a source domain and a target domain, which are denoted as d=S and d=T, respectively. It is assumed that a class to which data belongs is one of two classes, and which class it belongs to is denoted as y=0 and y=1.

Hereinafter, it is assumed that data of the class y=0 and data of the class y=1 appear in the source data, but only data of the class y=1 appears in the target data and the data of the class y=0 does not appear. That is, it is assumed that y=0 indicates a non-appearing class.

The class of y=0 is also denoted as a class 0. The class of y=1 is also denoted as a class 1.

Figure 5:
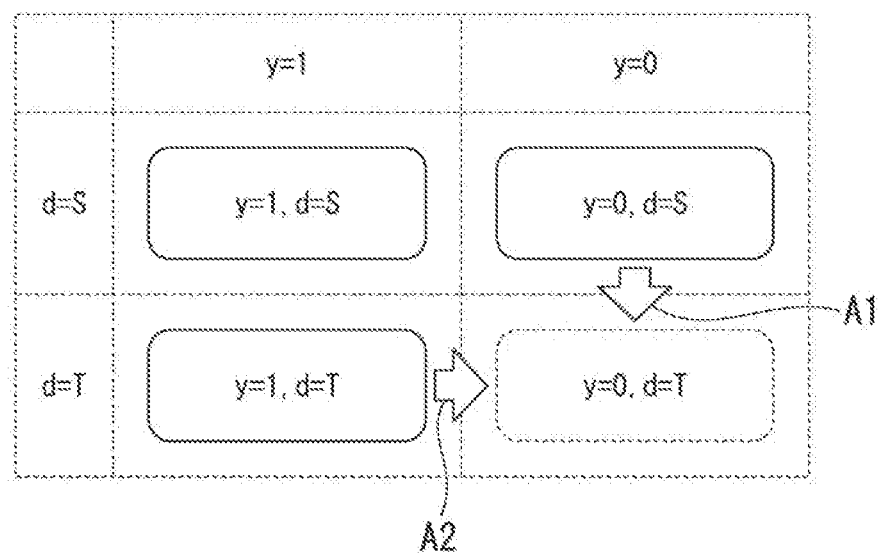
FIG. 5 is a diagram illustrating an example of data belonging to a domain and a class.

FIG. 5 is a diagram illustrating an example of data belonging to a domain and a class.

In the example of FIG. 5, there are two domains d=S and d=T, and there are two classes y=0 and y=1. As described above, d=S indicates a source domain, and d=T indicates a target domain. In addition, y=0 indicates a non-appearing class.

Among combinations of the domains and the classes, the domain d=S and the class y=1, the domain d=S and the class y=0, and the domain d=T and the class y=1 have data. On the other hand, the domain d=T and the class y=0 do not have data.

An arrow A1 indicates the deduction of data performed by the first deduction unit 140. The first deduction unit 140 deduces a weight for obtaining a loss related to the domain d=T and the class y=0 on the basis of the data of the domain d=S and the class y=0.

An arrow A2 indicates the deduction of data performed by the second deduction unit 150. The second deduction unit 150 deduces a weight for obtaining the loss related to the domain d=T and the class y=0 on the basis of the data of the domain d=T and the class y=1.

However, the number of classes handled by the data conversion learning apparatus 100 is only required to be plural. Therefore, the number of classes handled by the data conversion learning apparatus 100 is not limited to two but may be three or more.

The data conversion learning apparatus 100 acquires a plurality of sets of (x, y) as the source data. The data conversion learning apparatus 100 acquires a plurality of x and information as to which class is a non-appearing class as the target data.

The data conversion unit 110 converts the input data into data for performing domain identification and class identification (step S101). Specifically, the data conversion unit 110 executes domain adaptation to thereby output data obtained by converting the source data into data of the target domain.

The data conversion performed by the data conversion unit 110 includes parameters. These parameter values are optimized by machine learning. In the machine learning of the data conversion unit 110, the parameter values are adjusted so that the distributions of the source data and the target data match each other through the data conversion and the data can easily undergo the class identification.

The data conversion learning apparatus 100 may perform the data conversion using a neural network. In this case, parameters used for conversion are parameters of a neural network (such as, for example, connection weights between neurons). Hereinafter, the neural network used for the data conversion of the data conversion unit 110 is denoted as $NN_f$, the parameter is denoted as $\theta_f$, and the converted data is denoted as $z=NN_f(x|\theta_f)$.

The domain identification unit 120 uses the data converted by the data conversion unit 110 as an input, and identifies whether the input data is the source data or the target data (step S111).

The domain identification unit 120 may perform the domain identification using a neural network. Hereinafter, the neural network used for the domain identification is denoted as $NN_d$, the parameter is denoted as Od, and the identification result is denoted as $NN_d(z|\theta_d)$. The domain identification unit 120 outputs, as the identification result, probabilities that data belongs to a certain domain, the probabilities being lined up for each domain. The probability that data belongs to a certain domain is represented by the above-described domain certainty factor.

The domain identification performed by the domain identification unit 120 is represented as $[p(d=S|x), p(d=T|x)]=NN_d(z|\theta_d)$. Here, $p(d=S|x)$ represents a domain certainty factor that the domain of the data x is a source domain. In addition, $p(d=T|x)$ represents a domain certainty factor that the domain of the data x is a target domain.

The reason why x is used on the left side of the above expression is that the purpose is to perform the domain identification based on probability distribution on the source data and the target data which are input to the data conversion learning apparatus 100. Since the value of z depends on the value of x as in $z=NN_f(x|\theta_f)$, the above expression is established. The above expression may be represented as $[p(d=S|z), p(d=T|z)]=NN_d(z|\theta_d)$ in that the direct target of the domain identification is z.

The class identification unit 130 uses the data converted by the data conversion unit 110 as an input, and identifies a class of the input data (step S112). The class identification unit 130 may perform the class identification using a neural network. Hereinafter, the neural network used for the class identification is denoted as $NN_c$, the parameter is denoted as $\theta_c$, and the identification result is denoted as $NN_c(z|\theta_c)$. The class identification unit 130 outputs, as the identification result, probabilities that data belongs to a certain class which are lined up for each class. The probability that data belongs to a certain class is represented by the above-described class certainty factor.

The class identification performed by the class identification unit 130 is represented as $[p(y=0|x), p(y=1|x)]=NN_c(z|\theta_c)$. Here, $p(y=0|x)$ represents a class certainty factor that the class of the data x is the class of y=0. In addition, $p(y=1|x)$ represents a class certainty factor that the class of the data x is the class of y=1.

The reason why x is used on the left side of the above expression is that the purpose is to perform the class identification based on probability distribution on the source data and the target data which are input to the data conversion learning apparatus 100. Similarly to the case of the domain identification, since the value of z depends on the value of x as in $z=NN_f(x|\theta_f)$, the above expression is established. The above expression may be represented as $[p(y=0|z), p(y=1|z)]=NN_c(z|\theta_c)$ in that the direct target of the class identification is z.

The first deduction unit 140 deduces data of the non-appearing class on the basis of the domain certainty factor (step S121). Specifically, the first deduction unit 140 deduces a weight for calculating the loss related to the non-appearing class and the target domain on the basis of the domain certainty factor which is output by the domain identification unit 120 with respect to the domain data of the non-appearing class. Here, the domain identification result $NN_d(x|\theta_d)$ which is the amount of deduction of p(d|x) is used as the domain certainty factor. That is, the first deduction unit 140 deduces a weight for calculating a loss related to the target data of the class 0 on the basis of the domain certainty factor p(d|x) which is output by the domain identification unit 120 as the domain identification result with respect to the source data of the class 0. Since a loss is calculated for each sample of the source data of the class 0, the loss related to the target domain of the class 0 is referred to as the loss related to the target data of the class 0. The sample referred to here is an individual value indicated by data.

The first deduction unit 140 deduces the loss related to the target data of the class 0 by applying a weight calculated for each sample to a loss calculated for the sample with respect to the source data of the class 0.

Loss weighting is performed by multiplying the loss by the weight. The first deduction unit 140 calculates the loss related to the target data of the class 0 by multiplying a loss calculated for the source data of the class 0 by a weight calculated for the data.

Since the distribution of the source data of the class 0 is $p(x|d=S, y=0)$ and the distribution of the target data of the class 0 is $p(x|d=T, y=0)$, a weight $w_d(x)$ is only required to be set as in Expression (1).

$$w_d(x) = \frac{p(x \mid d=T, y=0)}{p(x \mid d=S, y=0)} \quad (1)$$

Here, supposing that conditional independence (p(d, y|x) =p(d|x)p(y|x)) of the domain d and the class y is established, the above weight can be transformed as in Expression (2) using the Bayes' theorem.

$$w_d(x) = \frac{p(d=S)}{p(d=T)} \frac{p(d=T \mid x)}{p(d=S \mid x)} \quad (2)$$

The first deduction unit 140 calculates the weight $w_d(x)$ on the basis of Expression (2).

Here, neither p(d=S) nor p(d=T) can be deduced from the data. Consequently, these values are set manually in advance. As the values of p(d=S) and p(d=T), the ratio of the number of samples included in the source data to the number of samples included in the target data in the input to the data conversion learning apparatus 100 may be used, but there is no limitation thereto. Any probability can be set as the values of p(d=S) and p(d=T).

In this manner, the first deduction unit 140 can calculate the weight $w_d(x)$ using the domain certainty factor p(d|x). The first deduction unit 140 deduces the loss related to the target data of the class 0 (the loss related to the target domain of the class 0) by weighting a loss related to the source data of the class 0, and outputs the deduction result to the class identification learning unit 160.

A method of deducing a weight which is performed by the data conversion learning apparatus 100 is not limited to a method of using weighting for each sample. For example, the data conversion learning apparatus 100 may use a method based on a generation model using generative adversarial networks.

An optimization method which is used by the data conversion learning apparatus 100 for machine learning is not limited to a specific method, and can be various known methods. The loss which is used by the data conversion learning apparatus 100 can be various losses in accordance with the optimization method.

The second deduction unit 150 deduces data of the non-appearing class on the basis of the class certainty factor (step S122). Specifically, the second deduction unit 150 deduces a weight for calculating a loss related to the target domain of the non-appearing class on the basis of the class certainty factor which is calculated by the class identification unit 130 with respect to the domain data of the non-appearing class. Here, the class identification result $NN_c(x|\theta_c)$ which is the amount of deduction of $p(y|x)$ is used as the class certainty factor. That is, the second deduction unit 150 deduces a weight for calculating the loss related to the target data of the class 0 on the basis of the class certainty factor $p(y|x)$ which is output by the class identification unit 130 as the class identification result with respect to the target data of the class 1. Since a loss is calculated for each sample of the target data of the class 1, the loss related to the target domain of the class 0 is referred to as the loss related to the target data of the class 0.

The second deduction unit 150 deduces the loss related to the target data of the class 0 by applying a weight calculated for each sample to a loss calculated for the sample with respect to the target data of the class 1. Specifically, the second deduction unit 150 calculates the loss related to the target data of the class 0 by multiplying the loss calculated for the target data of the class 1 by a weight calculated for the data.

Since the distribution of the target data of the class 1 is $p(x|d=T, y=1)$ and the distribution of the target data of the class 0 is $p(x|d=T, y=0)$, a weight $w_c(x)$ is only required to be set as in Expression (3).

$$w_c(x) = \frac{p(x|d=T, y=0)}{p(x|d=T, y=1)} \quad (3)$$

Here, supposing that conditional independence ($p(d, y|x) = p(d|x)p(y|x)$) of the domain d and the class y is established, the above weight can be transformed as in Expression (4) using the Bayes' theorem.

$$w_c(x) = \frac{p(y=1)}{p(y=0)} \frac{p(y=0|x)}{p(y=1|x)} \quad (4)$$

The second deduction unit 150 calculates the weight $w_c(x)$ on the basis of Expression (4).

Here, neither the value of $p(y=0)$ nor the value of $p(y=1)$ can be deduced from the data. Consequently, these values are set manually in advance. As the values of $p(y=0)$ and $p(y=1)$, the ratio of the number of samples included in the data of the class 0 to the number of samples included in the data of the class 1 in the input to the data conversion learning apparatus 100 may be used, but there is no limitation thereto. Any probability can be set as the values of $p(y=0)$ and $p(y=1)$.

In this manner, the second deduction unit 150 can calculate the weight $w_c(x)$ using the class certainty factor $p(y|x)$. The second deduction unit 150 deduces the loss related to the target data of the class 0 (the loss related to the target domain of the class 0) by weighting a loss related to the target data of the class 1, and outputs the deduction result to the domain identification learning unit 170.

The class identification learning unit 160 uses the source data, the target data, and the loss deduced by the first deduction unit 140 to perform machine learning on the parameter $\theta_f$ for data conversion and the parameter $\theta_c$ for class identification (step S131). The class identification learning unit 160 performs machine learning so as to minimize the sum of losses for all the domains and all the classes. That is, the class identification learning unit 160 performs machine learning so as to minimize the sum of empirical losses for the source data of the class 0, the target data of the class 0, the source data of the class 1, and the target data of the class 1.

The domain identification learning unit 170 uses the source data, the target data, and the loss deduced by the second deduction unit 150 to perform machine learning the parameter $\theta_f$ for data conversion and the parameter Od for domain identification (step S132). The domain identification learning unit 170 performs machine learning so as to minimize the sum of losses for all the domains and all the classes. That is, the domain identification learning unit 170 performs machine learning so as to minimize the sum of empirical losses for the source data of the class 0, the target data of the class 0, the source data of the class 1, and the target data of the class 1.

The data conversion learning apparatus 100 determines whether an end condition is established (step S141). Specifically, the data conversion learning apparatus 100 determines whether machine learning has been performed on all the given learning data.

In a case where it is determined that the end condition is established, the data conversion learning apparatus 100 ends the process of FIG. 4. In this case, the data conversion learning apparatus 100 sets the obtained parameter $\theta_f$ for data conversion in the data conversion unit 110. Thereby, the machine learning result is reflected in the data conversion unit 110, and the domain adaptation performed by the data conversion unit 110 can be used in practice.

On the other hand, in a case where it is determined that the end condition is not established, the process returns to step S101. In this case, the data conversion learning apparatus 100 continues to perform machine learning using learning data for which machine learning has not been implemented.

Only one of the class identification learning unit 160 and the domain identification learning unit 170 may learn the data conversion performed by the data conversion unit 110. Therefore, the learning unit 102 uses the domain certainty factor to perform machine learning on the calculation of the class certainty factor performed by the class identification unit 130, uses the class certainty factor to perform machine learning on the calculation of the domain certainty factor performed by the domain identification unit 120, and uses at least any one of the domain certainty factor and the class certainty factor to perform machine learning on the data conversion performed by the data conversion unit 110.

As described above, the data conversion unit 110 performs data conversion for bringing the probability distribution of data of the source domain and the probability distribution of data of the target domain close to each other. The identification unit 101 calculates at least any one of the domain certainty factor and the class certainty factor. The domain certainty factor indicates certainty that data that has undergone the data conversion belongs to the domain for each of the source domain and the target domain. The class certainty factor indicates certainty that the data that has undergone data conversion is classified into the class for each class into which the data of the source domain is classified. The learning unit 102 calculates the loss related to the non-appearing class and the target domain using at least any one of the domain certainty factor and the class certainty factor, and performs machine learning on the data conversion performed by the data conversion unit 110 using the calculated loss. The non-appearing class is a class that does not appear in the target domain among the classes into which the data of the source domain is classified.

Thereby, in the data conversion learning apparatus 100, in a case where there is a non-appearing class, it is possible to calculate a loss for the non-appearing class and the target domain in which there is no data before domain adaptation, and to perform machine learning for domain adaptation performed by the data conversion unit 110. According to the data conversion learning apparatus 100, in this regard, it is possible to avoid or reduce a decrease in the accuracy of domain adaptation.

In addition, the data conversion unit 110 uses a neural network as a data conversion method.

Thereby, the data conversion unit 110 can perform machine learning on the data conversion method.

In addition, the learning unit 102 uses the loss calculated using the domain certainty factor to perform machine learning on the calculation of the class certainty factor, and uses the loss calculated using the class certainty factor to perform machine learning on the calculation of the domain certainty factor.

Thereby, the data conversion learning apparatus 100 can avoid both a decrease in learning efficiency due to the loss obtained using the domain certainty factor being applied to learning of the deduction of the domain certainty factor in the domain identification unit 120 and a decrease in learning efficiency due to the loss obtained using the class certainty factor being applied to learning of the deduction of the class certainty factor in the class identification unit 130.

A pattern recognition device may be configured using the data conversion learning apparatus 100.

Figure 6:
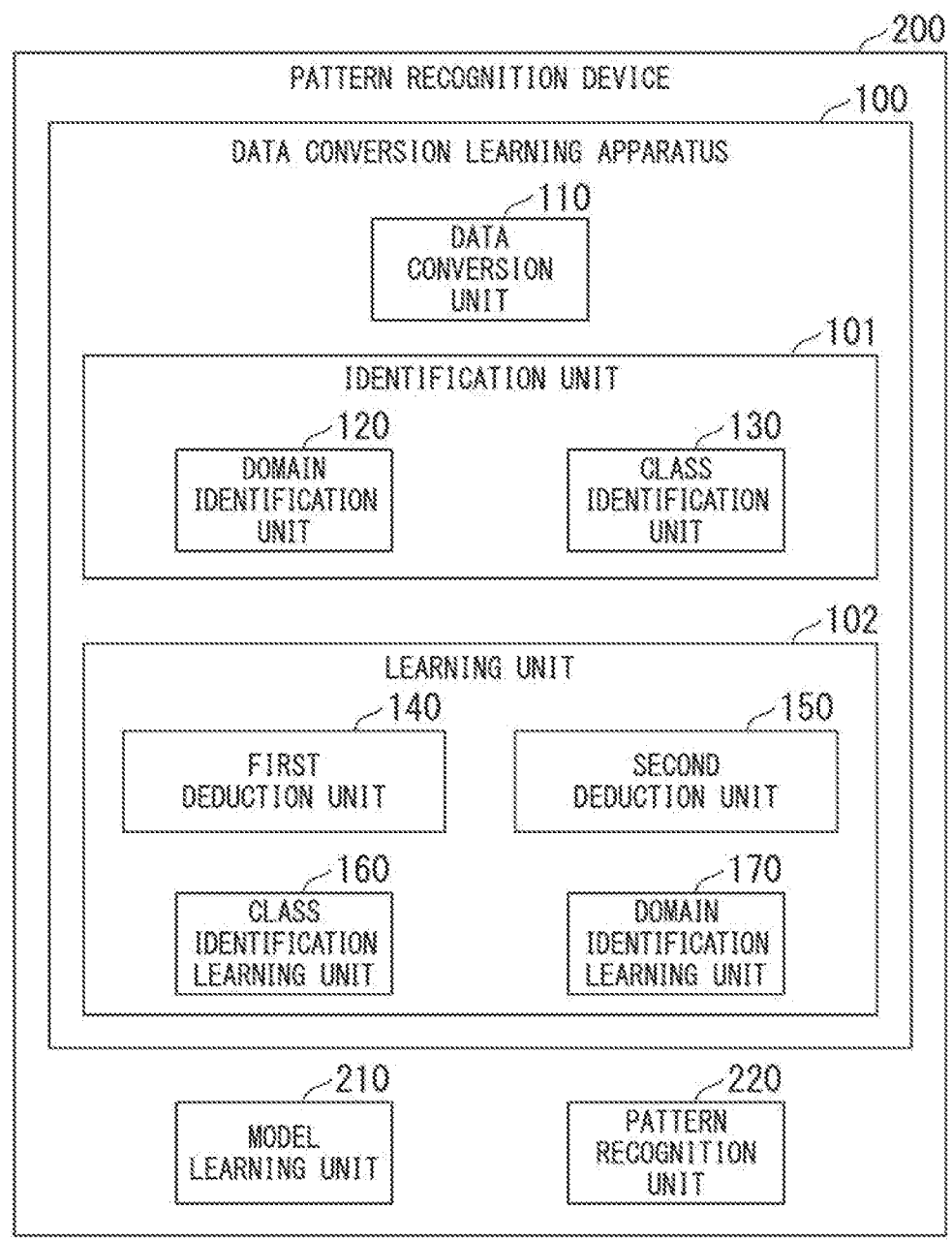
FIG. 6 is a schematic block diagram illustrating an example of a functional configuration of a pattern recognition device according to the example embodiment.

FIG. 6 is a schematic block diagram illustrating an example of a functional configuration of a pattern recognition device according to an example embodiment. A pattern recognition device 200 shown in FIG. 6 includes the data conversion learning apparatus 100, a model learning unit 210, and a pattern recognition unit 220. The data conversion learning apparatus 100 includes the data conversion unit 110, the domain identification unit 120, the class identification unit 130, the first deduction unit 140, the second deduction unit 150, the class identification learning unit 160, and the domain identification learning unit 170. A combination of the domain identification unit 120 and the class identification unit 130 is referred to as the identification unit 101. A combination of the first deduction unit 140, the second deduction unit 150, the class identification learning unit 160, and the domain identification learning unit 170 is referred to as the learning unit 102.

The data conversion learning apparatus 100 and each unit shown in FIG. 6 are the same as those in FIG. 1, are denoted by the same reference signs (100, 101, 102, 110, 120, 130, 140, 150, 160, 170), and thus the detailed description thereof will not be given.

The model learning unit 210 performs machine learning on a model for pattern recognition using learning data converted by the data conversion learning apparatus 100 through domain adaptation. A method used by the model learning unit 210 for machine learning of a model is not limited to a specific method, and, for example various known machine learning methods can be used.

The pattern recognition unit 220 performs pattern recognition using a model on which machine learning is performed by the model learning unit 210.

According to the pattern recognition device 200, the data conversion learning apparatus 100 performs machine learning using learning data on which domain adaptation is performed, and thus it is possible to avoid or reduce a decrease in the accuracy of learning due to the probability distribution of learning data and the probability distribution of test data being different from each other. According to the pattern recognition device 200, in this regard, it is possible to perform pattern recognition with a high degree of accuracy.

In addition, according to the pattern recognition device 200, in a case where there is a non-appearing class, it is possible to avoid or reduce a decrease in the accuracy of domain adaptation. Thereby, in the pattern recognition device 200, it is possible to avoid or reduce a decrease in the accuracy of pattern recognition due to there being a non-appearing class.

Next, the configuration of an example embodiment of the present invention will be described with reference to FIGS. 7 and 8.

Figure 7:
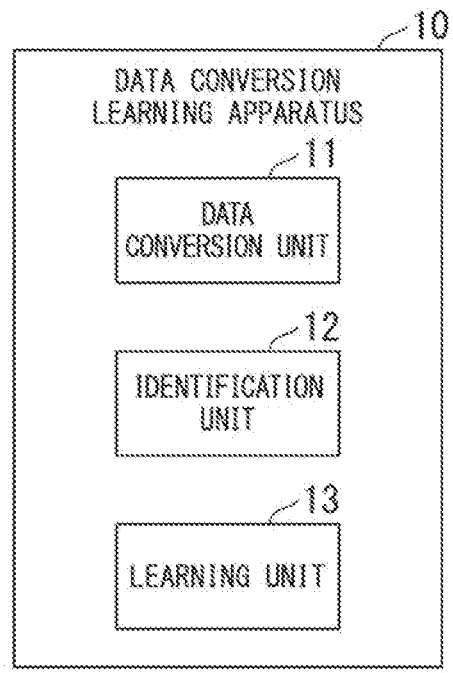
FIG. 7 is a diagram illustrating an example of a configuration of a data conversion learning apparatus according to an example embodiment.

FIG. 7 is a diagram illustrating an example of a configuration of a data conversion learning apparatus according to an example embodiment. A data conversion learning apparatus 10 shown in FIG. 7 includes a data conversion unit 11, an identification unit 12, and a learning unit 13.

With such a configuration, the data conversion unit 11 performs data conversion for bringing the probability distribution of data of the source domain and the probability distribution of data of the target domain close to each other. The identification unit 12 calculates at least any one of a domain certainty factor indicating certainty that data that has undergone data conversion belongs to the domain for each of the source domain and the target domain, and a class certainty factor indicating certainty that the data that has undergone data conversion is classified the class for each class into which the data of the source domain is classified. The learning unit 13 calculates a loss related to a target domain and a non-appearing class which is a class that does not appear in the target domain among the classes using at least any one of the domain certainty factor and the class certainty factor, and performs machine learning on the data conversion using the calculated loss.

Thereby, in the data conversion learning apparatus 10, in a case where there is a non-appearing class, it is possible to avoid a decrease in learning efficiency for the calculation of the domain certainty factor and a decrease in learning efficiency for the calculation of the class certainty factor.

Figure 8:
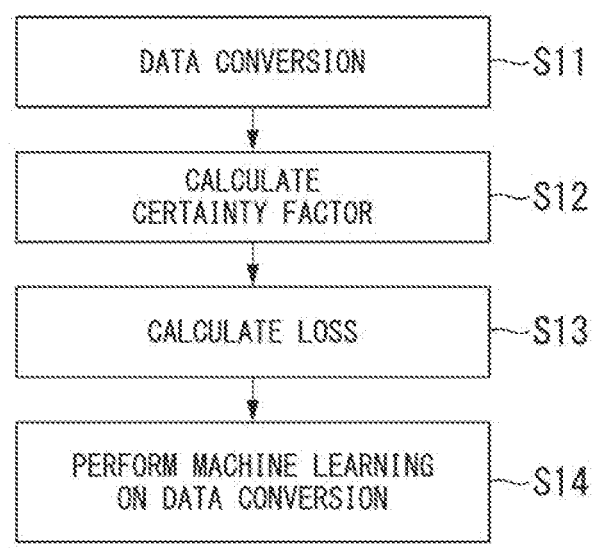
FIG. 8 is a diagram illustrating an example of a processing procedure of a data conversion learning method according to an example embodiment.

FIG. 8 is a diagram illustrating an example of a processing procedure of a data conversion learning method according to an example embodiment.

In the process shown in FIG. 8, data conversion for bringing the probability distribution of the data of the source domain and the probability distribution of the data of the target domain close to each other is performed in step S11. In step S12, at least any one of a domain certainty factor indicating certainty that data that has undergone data conversion belongs to the domain for each of the source domain and the target domain, and a class certainty factor indicating certainty that the data that has undergone data conversion belongs to the class for each class into which the data of the source domain is classified is calculated. In step S13, a loss related to a target domain and a non-appearing class which is a class that does not appear in the target domain class among the classes is calculated using at least any one of the domain certainty factor and the class certainty factor. In step S14, machine learning is performed on data conversion performed by the data conversion unit 110 using the loss calculated in step S13.

According to such a data conversion learning method, in a case where there is a non-appearing class which is a class that does not appear in the target domain among the classes appearing in the source domain, it is possible to avoid a decrease in the accuracy of identification of the non-appearing class.

Figure 9:
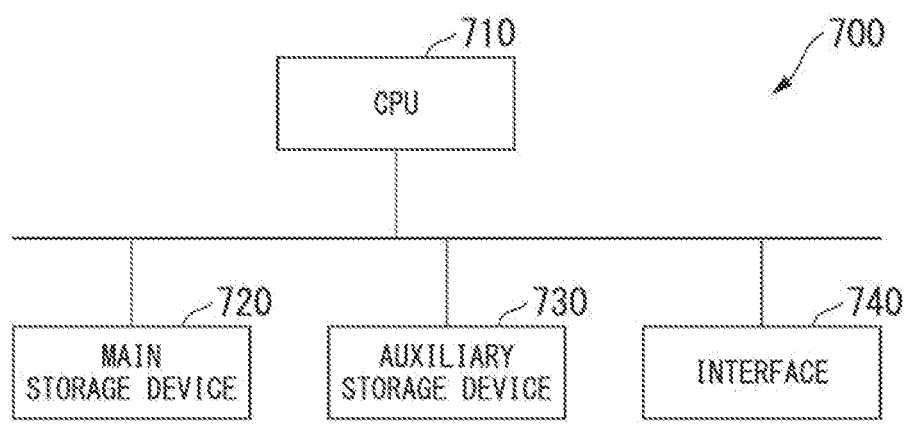
FIG. 9 is a schematic block diagram illustrating a configuration of a computer according to at least one example embodiment.

FIG. 9 is a schematic block diagram illustrating a configuration of a computer according to at least one example embodiment.

In the configuration shown in FIG. 9, a computer 700 includes a central processing unit (CPU) 710, a main storage device 720, an auxiliary storage device 730, and an interface 740.

Any one or more of the data conversion learning apparatuses 10 and 100 and the pattern recognition device 200 may be mounted in the computer 700. In that case, the operation of each processing unit described above is stored in the auxiliary storage device 730 in the format of a program. The CPU 710 reads out a program from the auxiliary storage device 730 to develop the read-out program into the main storage device 720, and executes the above process in accordance with the program. In addition, the CPU 710 secures a storage area corresponding to each storage unit described above in the main storage device 720 in accordance with the program. Communication between the data conversion learning apparatus 10 or 100 and another device is executed by the interface 740 having a communication function and performing communication in accordance with control of the CPU 710. The user interface of the data conversion learning apparatus 10 or 100 is executed by the interface 740 including a display device to display data or including an input device to accept input of data.

In a case where the data conversion learning apparatus 10 is mounted in the computer 700, the operations of the data conversion unit 11, the identification unit 12, and the learning unit 13 are stored in the auxiliary storage device 730 in the format of a program. The CPU 710 reads out a program from the auxiliary storage device 730 to develop the read-out program into the main storage device 720, and executes the above process in accordance with the program.

In a case where the data conversion learning apparatus 100 is mounted in the computer 700, the operations of the data conversion unit 110, the domain identification unit 120, the class identification unit 130, the first deduction unit 140, the second deduction unit 150, the class identification learning unit 160, and the domain identification learning unit 170 are stored in the auxiliary storage device 730 in the format of a program. The CPU 710 reads out a program from the auxiliary storage device 730 to develop the read-out program into the main storage device 720, and executes the above process in accordance with the program.

In a case where the pattern recognition device 200 is mounted in the computer 700, the operations of the data conversion unit 110, the domain identification unit 120, the class identification unit 130, the first deduction unit 140, the second deduction unit 150, the class identification learning unit 160, the domain identification learning unit 170, the model learning unit 210, and the pattern recognition unit 220 are stored in the auxiliary storage device 730 in the format of a program. The CPU 710 reads out a program from the auxiliary storage device 730 to develop the read-out program into the main storage device 720, and executes the above process in accordance with the program.

Meanwhile, a program for realizing all or some of functions of the data conversion learning apparatuses 10 and 100 is recorded in a computer readable recording medium, and thus a process of each unit may be performed by causing a computer system to read and execute the program recorded in this recording medium. The term "computer system" as used here includes hardware such as an operating system (OS) or peripheral devices.

The term "computer readable recording medium" refers to a flexible disk, a magneto-optic disc, a read only memory (ROM), a portable medium such as a compact disc read only memory (CD-ROM), and a storage device such as a hard disk built into the computer system. In addition the above-mentioned program may be a program which is used for realizing some of the aforementioned functions, and may be a program which is capable of realizing the aforementioned functions by a combination of programs previously recorded in the computer system.

Hereinbefore, the example embodiments of the present invention have been described in detail with the accompanying drawings, but specific configurations are not limited to these example embodiments, and also include a change in design and the like without departing from the scope of the present invention.

INDUSTRIAL APPLICABILITY

The example embodiments of the present invention may be applied to a data conversion learning apparatus, a pattern recognition device, a data conversion learning method, and a recording medium.

REFERENCE SYMBOLS

10, 100 Data conversion learning apparatus
11, 110 Data conversion unit
12, 101 Identification unit
13, 102 Learning unit
120 Domain identification unit
130 Class identification unit
140 First deduction unit
150 Second deduction unit
160 Class identification learning unit
170 Domain identification learning unit
200 Pattern recognition device
210 Model learning unit
220 Pattern recognition unit

What is claimed is:

1. A data conversion learning apparatus comprising:
   at least one memory configured to store instructions; and
   at least one processor configured to execute the instructions to:
   perform data conversion for bringing a probability distribution of source data of a source domain and a probability distribution of target data of a target domain close to each other, the data conversion yielding converted data;
   acquire information of a non-appearing class among a plurality of classes;
   calculate a source domain certainty factor indicating certainty that the converted data belongs to the source domain and a target domain certainty factor indicating certainty that the converted data belongs to the target domain;

calculate a class certainty factor indicating certainty that the converted data is classified into each of the plurality of classes into which the source data is classified, wherein the plurality of classes include the non-appearing class and a first class other than the non-appearing class, and wherein the first class appears in the source domain and the target domain and the non-appearing class does not appear in the target domain;

calculate a first loss related to the non-appearing class based on the source domain certainty factor and the target domain certainty factor;

calculate a second loss related to the non-appearing class, based on the class certainty factor;

execute neural network operations to calculate the source domain certainty factor and the target domain certainty factor by evaluating source and target domain probabilities [p(d=S|x), p(d=T|x)] based on the converted data using a first neural network for domain identification [NN_d(z|θ_d)], and to calculate the class certainty factor by evaluating class probabilities [p(y=0|x), p(y=1|x)] based on the converted data using a second neural network for class identification [NN_c(z|θ_c)];

calculate the first loss using a weighted function of the source domain certainty factor and the target domain certainty factor, the weight being a ratio $wd(x)=p(x|d=T, y=0)/p(x|d=S, y=0)$, and calculate the second loss using a weighted function of the class certainty factor, the weight being a ratio $wc(x)=p(x|d=T, y=0)/p(x|d=T, y=1)$;

perform machine learning on the class certainty factor using the first loss; and perform machine learning on the source domain certainty factor and the target domain certainty factor using the second loss, wherein the variable x indicates data before the data conversion, the variable y indicates the class, the variable z indicates the converted data, the variable d indicates domain information, the subscript c indicates class information, the variable θ_d indicates a parameter of the first neural network, and the variable θ_c indicates a parameter of the second neural network, wherein using the first loss calculated using the source domain certainty factor and the target domain certainty factor includes calculating the first loss related to the target domain by a ratio of a first probability to a second probability, the first probability being a probability that the data of the target domain that has undergone the data conversion is classified as the non-appearing class that does not appear in the target domain, the second probability being a probability that the data of the source domain that has undergone the data conversion is classified as the non-appearing class that does not appear in the source domain, and wherein using the second loss calculated using the second class certainty factor includes calculating the second loss related to the target domain by a ratio of a third probability to a fourth probability, the third probability being a probability that the data of the target domain that has undergone the data conversion is classified as the non-appearing class that does not appear in the target domain, the fourth probability being a probability that the data of the target domain that has undergone the data conversion is classified as an appearing class that appears in the target domain.

2. The data conversion learning apparatus according to claim 1, wherein the at least one processor is configured to execute the instructions to perform the data conversion using a neural network.

3. The data conversion learning apparatus according to claim 1, wherein a relationship between the first probability and the second probability includes a ratio of the number of samples included in the data of the source domain to the number of samples included in the data of the target domain as input to the data conversion learning apparatus, and wherein a relationship between the third probability and the fourth probability includes a ratio of the number of samples included in the data of the non-appearing class to the number of samples included in the data of the appearing class as the input to the data conversion learning apparatus.

4. The data conversion learning apparatus according to claim 1, wherein a relationship between the first probability and the second probability includes one predetermined probability, and wherein a relationship between the third probability and the fourth probability includes another predetermined probability.

5. A pattern recognition device comprising:

the data conversion learning apparatus according to claim 1, wherein the at least one processor is configured to execute the instructions to perform pattern recognition using a pattern recognition model obtained from machine learning using the converted data.

6. A data conversion learning method performed by a computer and comprising:

performing data conversion for bringing a probability distribution of source data of a source domain and a probability distribution of target data of a target domain close to each other, the data conversion yielding converted data;

acquiring information of a non-appearing class among a plurality of classes;

calculating a source domain certainty factor indicating certainty that the converted data belongs to the source domain and a target domain certainty factor indicating certainty that the converted data belongs to the target domain;

calculating a class certainty factor indicating certainty that the converted data is classified into each of the plurality of classes into which the source data is classified, wherein the plurality of classes include the non-appearing class and a first class other than the non-appearing class, and wherein the first class appears in the source domain and the target domain and the non-appearing class does not appear in the target domain;

calculating a first loss related to the non-appearing class based on the source domain certainty factor and the target domain certainty factor;

calculating a second loss related to the non-appearing class, based on the class certainty factor;

executing neural network operations to calculate the source domain certainty factor and the target domain certainty factor by evaluating source and target domain probabilities [p(d=S|x), p(d=T|x)] based on the converted data using a first neural network for domain identification [NN_d(z|θ_d)], and to calculate the class certainty factor by evaluating class probabilities

[p(y=0|x), p(y=1|x)] based on the converted data using a second neural network for class identification [NN_c(z|θ_c)];

calculating the first loss using a weighted function of the source domain certainty factor and the target domain certainty factor, the weight being a ratio wd(x)=p(x|d=T, y=0)/p(x|d=S, y=0), and calculate the second loss using a weighted function of the class certainty factor, the weight being a ratio wc(x)=p(x|d=T, y=0)/p(x|d=T, y=1);

performing machine learning on the class certainty factor using the first loss; and performing machine learning on the source domain certainty factor and the target domain certainty factor using the second loss, wherein the variable x indicates data before the data conversion, the variable y indicates the class, the variable z indicates the converted data, the variable d indicates domain information, the subscript c indicates class information, the variable θ_d indicates a parameter of the first neural network, and the variable θ_c indicates a parameter of the second neural network, wherein using the first loss calculated using the source domain certainty factor and the target domain certainty factor includes calculating the first loss related to the target domain by a ratio of a first probability to a second probability, the first probability being a probability that the data of the target domain that has undergone the data conversion is classified as the non-appearing class that does not appear in the target domain, the second probability being a probability that the data of the source domain that has undergone the data conversion is classified as the non-appearing class that does not appear in the source domain, and wherein using the second loss calculated using the second class certainty factor includes calculating the second loss related to the target domain by a ratio of a third probability to a fourth probability, the third probability being a probability that the data of the target domain that has undergone the data conversion is classified as the non-appearing class that does not appear in the target domain, the fourth probability being a probability that the data of the target domain that has undergone the data conversion is classified as an appearing class that appears in the target domain.

7. A non-transitory recording medium storing a program executable by a computer to perform processing comprising:

performing data conversion for bringing a probability distribution of source data of a source domain and a probability distribution of target data of a target domain close to each other, the data conversion yielding converted data;

acquiring information of a non-appearing class among a plurality of classes;

calculating a source domain certainty factor indicating certainty that the converted data belongs to the source domain and a target domain certainty factor indicating certainty that the converted data belongs to the target domain;

calculating a class certainty factor indicating certainty that the converted data is classified into each of the plurality of classes into which the source data is classified, wherein the plurality of classes include the non-appearing class and a first class other than the non-appearing class, and wherein the first class appears in the source domain and the target domain and the non-appearing class does not appear in the target domain;

calculating a first loss related to the non-appearing class based on the source domain certainty factor and the target domain certainty factor;

calculating a second loss related to the non-appearing class, based on the class certainty factor;

executing neural network operations to calculate the source domain certainty factor and the target domain certainty factor by evaluating source and target domain probabilities [p(d=S|x), p(d=T|x)] based on the converted data using a first neural network for domain identification [NN_d(z|θ_d)], and to calculate the class certainty factor by evaluating class probabilities [p(y=0|x), p(y=1|x)] based on the converted data using a second neural network for class identification [NN_c(z|θ_c)];

calculating the first loss using a weighted function of the source domain certainty factor and the target domain certainty factor, the weight being a ratio wd(x)=p(x|d=T, y=0)/p(x|d=S, y=0), and calculate the second loss using a weighted function of the class certainty factor, the weight being a ratio wc(x)=p (x|d=T, y=0)/p(x|d=T, y=1);

performing machine learning on the class certainty factor using the first loss; and performing machine learning on the source domain certainty factor and the target domain certainty factor using the second loss, wherein the variable x indicates data before the data conversion, the variable y indicates the class, the variable z indicates the converted data, the variable d indicates domain information, the subscript c indicates class information, the variable θ_d indicates a parameter of the first neural network, and the variable θ_c indicates a parameter of the second neural network, wherein using the first loss calculated using the source domain certainty factor and the target domain certainty factor includes calculating the first loss related to the target domain by a ratio of a first probability to a second probability, the first probability being a probability that the data of the target domain that has undergone the data conversion is classified as the non-appearing class that does not appear in the target domain, the second probability being a probability that the data of the source domain that has undergone the data conversion is classified as the non-appearing class that does not appear in the source domain, and wherein using the second loss calculated using the second class certainty factor includes calculating the second loss related to the target domain by a ratio of a third probability to a fourth probability, the third probability being a probability that the data of the target domain that has undergone the data conversion is classified as the non-appearing class that does not appear in the target domain, the fourth probability being a probability that the data of the target domain that has undergone the data conversion is classified as an appearing class that appears in the target domain.

* * * * *